J. T. CASE.

WATER WHEEL.

No. 4,330. Reissued Apr. 11, 1871.

Witnesses,

James Shepard

C. A. Shepard.

Inventor,

Joel T. Case

THE NORRIS PETERS CO., PHOTO-LITHO., WASHINGTON, D. C.

United States Patent Office.

JOEL T. CASE, OF BRISTOL, CONNECTICUT, ASSIGNOR TO THE NATIONAL WATER-WHEEL COMPANY.

Letters Patent No. 108,757, dated November 1, 1870; reissue No. 4,330, dated April 11, 1871.

DIVISION B.

IMPROVEMENT IN WATER-WHEELS.

The Schedule referred to in these Letters Patent and making part of the same.

I, JOEL T. CASE, of Bristol, in the county of Hartford and State of Connecticut, have invented a new and useful Improvement in Water-Wheels, of which the following is a specification.

My invention consists of the peculiar construction and arrangement of the chutes in the case which surrounds the wheel, and in the combination of the chutes and gate as hereinafter described.

In the accompanying drawings—

Figure 1:
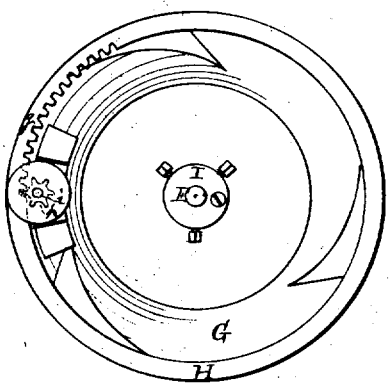
Figure 2:
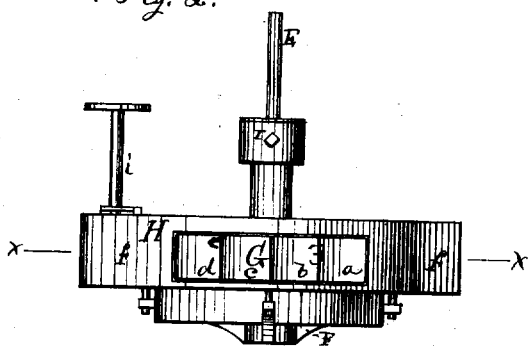
Figure 3:
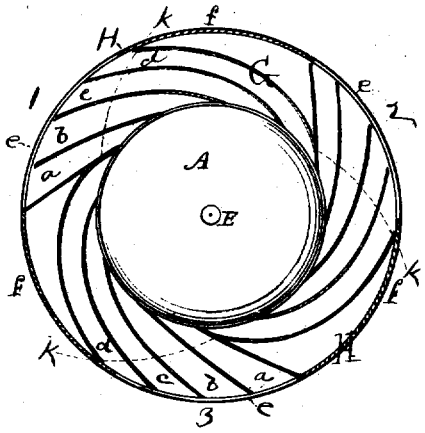

Figure 1 is a plan or top view of a wheel of my invention;

Figure 2, a side elevation of the same;

Figure 3, a horizontal section of the same on line *x x*; and

Figure 4:
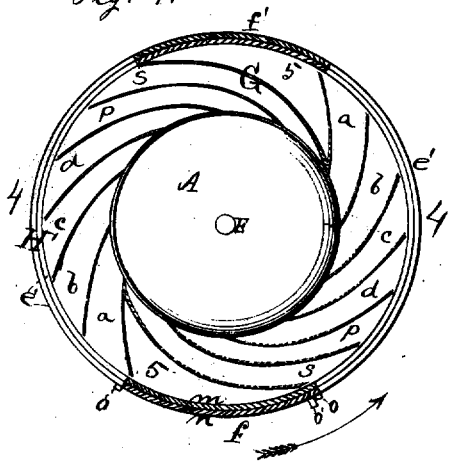

Figure 4, a horizontal section of a modification of the same.

A designates a wheel of the class which receives the water upon its edge, and which wheel is secured to the shaft E, having its bearings upon a step in the spider F and in the box I, as in ordinary wheels.

Surrounding the wheel A is the case G, in which are arranged the eccentric or tangential chutes *a b c d*.

These chutes are formed in three groups; the inlet or port, 1 2 3, of each group occupies one-sixth of the circumference or outer edge of the case G, while at their discharge end each group occupies one-third of the inner edge of the case G, the discharge end of the chutes thus being divided at equal distances from each other upon all sides of the wheel A, as shown in fig. 3.

Surrounding the case G is the gate H, of cylindric or hoop form, and is provided with openings *e* and solid portions or rims *f*, each of which occupies one-sixth of the gate H.

The upper edge of the gate H is provided with segment-gear *g*, which meshes into pinion *h* on the shaft *i*.

In figs. 2 and 3 the solid portion or rims *f* are in front of the blank space between the groups of chutes, and the openings *e* are immediately in front of the inlets or ports 1 2 3, and consequently the chutes are all open.

If desired to reduce the flow of water to the wheel the gate H is turned, by means of shaft *i*, &c., until the rims *f* (or a portion of them) cover the mouth of the chutes *d*, which reduces the flow of water by one-fourth. If turned so as to cover the chutes *d e* only one-half the water is used, and so on until the gate is entirely closed by the rims *f* covering the whole of each inlet or port 1 2 3.

The ports 1 2 3, if desired, might be arranged on the lines *k* and opened by a sliding gate, which would produce the same effect by means of the same chutes as above described.

In fig. 4 is shown a modification of the case G in which the inlet or port 4 4 of the two groups of chutes *a b c d p s* occupies one-third of the circumference or outer edge of the case G, while the discharge end of each group of chutes occupies one-half of the inner edge of said case.

The blank space 5 between the groups of chutes occupies one-sixth of the outer edge of said case.

One object of this modification is to increase the width of the mouth of the chutes.

The gate H′ is formed of two hoops, *m n*, each provided with openings *e′* and rims *f′*, each opening occupying one-third of each hoop, and each rim *f′* one-sixth of the same.

Two shoulders or projections, *o o*, are secured to the inner hoop *m*, and a projection, *o′*, to the outer hoop *n*.

By any proper mechanism the hoop *m* is rotated in the direction indicated by the dart, and, after moving one-sixth of its circumference, one of the projections *o* will strike the projection *o′*, when both hoops *m n* will rotate together until the rims *f′* of the two hoops entirely cover the ports 4 4 and thus close all of the chutes.

By reversing the operation of the gate H′ the chutes are opened in like manner, as shown in the drawings.

This modification also enables me to divide the amount of water used into smaller fractions, by using only one-sixth of a full-gate, and so on, as desired, while the style, shown in the other figures of the drawing, is graduated by fourths—the case G in both styles being provided with the same number of chutes.

The case G may be made deeper on its outer edge than at its inner edge for the purpose of increasing the area of the mouth of the chutes, if desired.

By my invention one or more chutes upon opposite sides (or at equal distances around the wheel) can be fully opened, while all the other chutes remain closed.

The chutes which are used being wholly opened discharge a sufficient amount of water upon the wheel to fill each bucket as it passes said chute, and, therefore, the water at a "part-gate" is nearly as effective in proportion to the amount used as if all the chutes were opened.

The peculiar mechanism for operating the gates is not considered essential to the other parts of my invention.

I claim as my invention—

1. The case G, with the chutes *a b c d* arranged in groups, substantially as and for the purpose described.

2. In combination with the foregoing, the gate H, the whole operating together, as and for the purpose set forth.

3. So combining the chutes *a b c d* of the case surrounding the wheel A with the gate for closing said chutes that a partial movement of the gate is made to fully open a portion of said chutes and at the same time to leave the remaining portion of the chutes closed, substantially as and for the purpose described.

JOEL T. CASE.

Witnesses:
JAMES SHELARD,
C. A. SHEPARD.